US010945147B2

(12) United States Patent
Frenne et al.

(10) Patent No.: US 10,945,147 B2
(45) Date of Patent: Mar. 9, 2021

(54) DYNAMIC CSI REPORTING TYPE

(71) Applicant: TELEFONAKTIEBOLAGET LM ERICSSON (PUBL), Stockholm (SE)

(72) Inventors: Mattias Frenne, Uppsala (SE); Stephen Grant, Pleasanton, CA (US); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 70 days.

(21) Appl. No.: 15/278,202

(22) Filed: Sep. 28, 2016

(65) Prior Publication Data
US 2018/0091992 A1    Mar. 29, 2018

(51) Int. Cl.
| H04W 24/10 | (2009.01) |
| H04L 5/00 | (2006.01) |
| H04W 72/04 | (2009.01) |
| H04W 72/08 | (2009.01) |
| H04B 7/06 | (2006.01) |
| H04W 88/02 | (2009.01) |

(52) U.S. Cl.
CPC .......... *H04W 24/10* (2013.01); *H04B 7/0626* (2013.01); *H04B 7/0645* (2013.01); *H04L 5/0048* (2013.01); *H04W 72/042* (2013.01); *H04W 72/082* (2013.01); *H04W 88/02* (2013.01)

(58) Field of Classification Search
CPC .. H04B 7/0626; H04B 7/0645; H04B 7/0612; H04B 7/0417; H04B 17/24; H04L 1/0026; H04W 24/10
See application file for complete search history.

(56) References Cited

U.S. PATENT DOCUMENTS

| 2010/0075672 | A1 |  | 3/2010 | Jwa et al. |
| 2013/0003788 | A1 | * | 1/2013 | Marinier ............... H04B 7/024 375/219 |
| 2013/0083780 | A1 | * | 4/2013 | Luo ................... H04W 72/0406 370/336 |
| 2013/0258954 | A1 | * | 10/2013 | Khoshnevis .......... H04L 1/0026 370/329 |

(Continued)

FOREIGN PATENT DOCUMENTS

WO    2012/105793 A2    8/2012

OTHER PUBLICATIONS

3rd Generation Partnership Project; 3G00 TS 36.213 V 13.2.0; Technical Specification Group Radio Access Network; Evolved Universal Terrestrial Radio Access (E-UTRA); Physical layer procedures (Release 13); Jun. 30, 2016.

(Continued)

*Primary Examiner* — Elton Williams
(74) *Attorney, Agent, or Firm* — Withrow & Terranova, PLLC

(57) ABSTRACT

This disclosure pertains to a terminal for a Radio Access Network, the terminal being adapted for transmitting a measurement report on received reference signaling. The measurement report is based on one report type out of a set of possible report types, the terminal determining the report type of the measurement report based on a measurement report type indication in a downlink control information message received by the terminal. There are also disclosed further related methods and devices.

21 Claims, 6 Drawing Sheets

(56) References Cited

U.S. PATENT DOCUMENTS

2013/0322376 A1* 12/2013 Marinier ............... H04W 72/06
                                                     370/329
2017/0170940 A1*  6/2017 Lee ....................... H04L 5/0048
2018/0062724 A1*  3/2018 Onggosanusi ....... H04B 7/0413
2018/0175983 A1*  6/2018 Yum ........................ H04L 1/00
2019/0140725 A1*  5/2019 Aiba .................... H04B 7/0626

OTHER PUBLICATIONS

Samsung Ericsson: "WF on Framework for NR MIMO," 3GPP draft R1-168105; 3rd Generation Partnership Project; vol. RAN WG1; Gothenburg, Sweden; Aug. 28, 2016.
International Search Report and Written Opinion for International Patent Application No. PCT/SE2017/050275, dated Jun. 2, 2017, 8 pages.

* cited by examiner

DYNAMIC CSI REPORTING TYPE

TECHNICAL FIELD

The present disclosure pertains to wireless communication technology, in particular to reference signaling.

BACKGROUND

In LTE (Long Term Evolution, a 3GPP wireless communication standard), there are 10 transmission modes (TM) defined, which may be used by the network node (eNodeB). For example, TM1 represents single antenna port transmission, TM2 transmit diversity, TM3 open loop spatial multiplexing, TM4 closed loop spatial multiplexing and so on.

Each TM is associated with a feedback scheme for measurement reporting (CSI reporting, Channel State Information reporting) by the user equipment (UE). For example, if TM1 is configured, the UE measures the channel using a single antenna port and computes CQI (Channel Quality Indicator, information pertaining to transmission quality of/over the channel). If, for example, TM4 is configured, the UE measures the channels from multiple antenna ports, and computes CQI, PMI (Precoding Matrix Indicator, indicating a precoder/precoding matrix to be preferred, which represents a beamforming mode) and RI (Rank Indicator), where PMI indicates the preferred precoding matrix and RI the preferred rank.

In TM3, the PMI is not reported since the transmission scheme is open loop, but CQI and RI is reported. Additionally, when rank>1, then multiple codewords are used so the UE reports two CQIs, one per code word.

The transmission mode is configured to the UE using dedicated RRC (Radio Resource Control, signaling on a layer above the physical radio layer) signaling, together with a feedback scheme that matches the transmission mode as discussed above. For each TM, there are multiple possible refinements of CSI feedback schemes, for instance to distinguish wideband CQI only reporting or subband CQI reporting. There is one feedback scheme for periodic CSI reporting using PUCCH (Physical Uplink Control CHannel) and another feedback scheme used for the aperiodic CSI reporting using PUSCH (Physical Uplink Shared CHannel). The used CSI feedback schemes are also RRC configured. As control utilising RRC signaling occurs on long time scales, related behaviour and settings are usually considered semi-static.

In TM10, the UE may be configured to provide multiple CSI reports, each associated with a CSI process. The UE must be able to report reports for some maximum number of CSI processes simultaneously. If the UE receives a CSI request for more than this maximum number, it drops the low priority CSI reports. A UE configured to report CSI for TM10 may only report CSI for PDSCH (Physical Downlink Shared CHannel) transmission schemes where DMRS is transmitted, which excludes a UE from being able to report CSI for both TM10 and TM3.

Since the CSI reporting scheme is tied to the transmission mode, higher layer signaling is required to change the CSI reporting content and this introduces delays. With the introduction and more excessive use of aperiodic CSI reports, there will sometimes be possibilities or requirements to feed back CSI more, and sometimes less, frequently.

High spatial resolution CSI reports (as used e.g. for highly beamformed transmission) requires frequent reporting (since the channel gets outdated quickly) which lower resolution CSI report has a longer life time.

Thus, for CSI reporting there has to be found a balance between spatial resolution accuracy and validity in time.

For up to some maximum number of CSI processes, a UE must be able to provide a CSI report for any of its configured CSI processes. There is no mechanism allowing a UE to switch among a set of CSI reporting configurations such that it only computes CSI for one of the set at a time for a given CSI process. Also, a UE cannot report CSI for both open loop and closed loop transmission schemes if the transmission schemes correspond to PDSCH where DMRS is transmitted.

For new radio technologies, in particular with increasing number of antennas used for transmission from the network side, flexible approaches for measurement reporting are desirable, to cover a wide range of possible scenarios and use cases, without unduly increasing signaling overhead.

SUMMARY

It is an object of this disclosure to present approaches allowing a flexible approach for measurement reporting, avoiding unnecessary overhead.

There is disclosed a terminal for a Radio Access Network. The terminal is adapted for transmitting a measurement report on received reference signaling. The measurement report is based on one report type out of a set of possible report types, the report type of the measurement report being determined based on a measurement report type indication in a downlink control information message received by the terminal. The terminal may comprise a transmitting module for transmitting the measurement report, and/or a report type determining module for determining the report type. The terminal may be adapted for performing measurements based on the downlink control information message, based on which the measurement report may be transmitted. The terminal may comprise a measuring module for performing the measurements.

Moreover, there is described a method for operating a terminal in a Radio Access Network. The method comprises transmitting a measurement report on received reference signaling. The measurement report is based on one report type out of a set of possible report types, the report type of the measurement report being determined based on a measurement report type indication in a downlink control information message received by the terminal. The method may comprise performing measurements based on the downlink control information message, based on which the measurement report may be transmitted.

A network node for a Radio Access Network may be considered. The network node is adapted for transmitting, e.g. to a terminal, a downlink control information message. The downlink control information message comprises a measurement report type indication indicating a report type of a measurement report, the report type being one report type out of a set of possible report types. The network node may comprise a transmitting module for transmitting the downlink control information message, and/or a report type setting module for setting the report type and/or for setting the measurement report type indication in the message.

Also, a method for operating a network node in a Radio Access Network is described. The method comprises transmitting, e.g. to a terminal, a downlink control information message. The downlink control information message comprises a measurement report type indication indicating a report type of a measurement report, the report type being one report type out of a set of possible report types. The method may comprise setting the report type and/or setting the measurement report type indication in the message.

Providing the report type in a downlink control information message in such an explicit manner, allows decoupling of transmission modes and measurements. Also, it facilitates quick and dynamic adaptation of measurements based on current conditions or needs.

A report type may generally indicate a transmission setup for the reference signaling. A transmission setup may pertain to, and/or represent, parameters used for transmission, e.g. number of ports, expected response/feedback, transmit diversity, etc.

The set of possible report types may include, as possible report types, report types pertaining to:
Single port use; and/or
Transmit diversity across two or more ports; and/or
Open loop spatial multiplexing using two or more ports; and/or
Semi-open loop multiplexing using two or more ports; and/or
Closed loop spatial multiplexing using two or more ports; and/or
High resolution measurement reporting, e.g. using two or more ports; and/or
Reciprocity based feedback; and/or
Analog channel feedback; and/or
Interference reporting.

The set may comprise any one or any combination of such report types. In particular, the set may comprise a report type pertaining to single port use and at least one pertaining to multiple port use, e.g. to transmit diversity.

There is also considered a program product comprising instructions adapted for causing control circuitry to carry out and/or control any method described herein, in particular when executed on the control circuitry.

A storage medium is also described, the storage medium storing a program product as described herein, and/or instructions adapted for causing control circuitry to carry out and/or control any method described, in particular when executed on the control circuitry.

A report type may generally indicate to the terminal one or more parameters and/or conditions and/or assumptions how and/or which measurements to perform and/or how to create or determine the measurement report. The report type may generally be aperiodic. In particular, the report type may indicate which parameters to report, e.g. CQI and/or RI and/or PMI, and/or on which (physical) channel the report is to be transmitted, e.g. a physical uplink control channel like PUCCH or a physical uplink shared channel like PUSCH (the specific channels may be according to 3GPP standards).

A downlink control information message may generally be a message comprising control information, e.g. information pertaining to measurements and/or scheduling information and/or power control information. The message may be a physical layer message. In particular, a downlink control information message may be a DCI message according to a 3GPP standard. The message may generally be transmitted by a network node.

A Radio Access Network (RAN) may be any kind of cellular and/or wireless radio network, which may be connected or connectable to a core network. A RAN may for example be a 5G network, e.g. advance LTE and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. Transmitting in downlink may pertain to transmission from the network or network node to the terminal. Transmitting in uplink may pertain to transmission from the terminal to the network or network node.

Signaling may generally comprise one or more signals and/or one or more symbols. Reference signaling may comprise one or more reference signals or symbols. Reference signaling may be cell-specific or user-specific. A terminal or network node may be adapted to measure reference signaling, e.g. for demodulation and/or power control and/or to determine channel state information representing the transmission quality of a measured channel (representing the propagation of signaling using specific transmission parameters and/or the transmission path). Reference signaling may in particular be CSI-RS (Channel State Information Reference Signaling). It may be considered that reference signaling is received by the terminal.

A measurement report may generally represent information based on, and/or pertaining to, measurement/s that have been performed on reference signaling. The report type may pertain to the measurement report. A measurement report may comprise and/or indicate measurement samples and/or information pertaining thereto and/or parameters determined based on measurements performed, and/or information related to channel state or quality, e.g. CQI and/or PMI and/or RI. The report may contain values computed and/or estimated and/or calculated based on measurement results, as examples of a report being based on and/or determined based on measurements.

The measurement report type indication may generally indicate and/or determine and/or define the report type, in particular for the (receiving) terminal. The terminal may determine (for itself) the measurement report type based on the indication, e.g. by reading and/or extracting the indication out of the message, and/or triggering a determining procedure. The indication may generally comprise one or more parameters, which may indicate the report type e.g. based on a mapping of report type to indication, and/or indexing a table, and/or directly identifying the report type (e.g., by a name or code).

Setting the report type and/or setting the measurement report type indication in the message may comprise determining a suitable report type, e.g. based on operational conditions, e.g. transmission conditions and/or number of terminals served by the network node.

In the context of this disclosure, the term "dynamically" may generally pertain to transmitting information or instructions using a downlink control information message, due to the involved dynamic timescale. Feedback may generally refer to providing and/or transmitting a measurement report. Providing an indication that a report is invalid may pertain to indicate that no report is transmitted, or the report does not contain information that should be used and/or confirms to instructions (which may be provided via a downlink control information message). Sending a report identically for a second time may be an indication of invalidity of the report. Trigger a measurement or a measurement report may indicate that a downlink control information message is transmitted instruct measurement and/or that a measurement report has to be transmitted.

BRIEF DESCRIPTION OF THE DRAWINGS

The drawings are provided to illustrate and elucidate concepts and approaches described herein and are not intended to limit their scope. They comprise.

DETAILED DESCRIPTION

Figure 1:
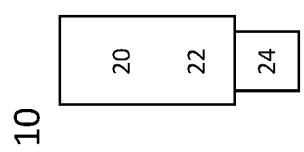
FIG. 1, showing an exemplary terminal.

There is generally suggested dynamically indicating in a downlink control information message (in particular a Downlink Control Information message according to a 3GPP standard) indicating what type of CSI report the UE shall feedback in the uplink control information message, in particular an Uplink Control Information (UCI) according to 3GPP standard/s. The downlink control message may be provided and/or transmitted by a network node, which may be the network node controlling terminal receiving the message.

The downlink control message (DCI message) may also contain information indicating scheduling of resources or configuration of the transmission of the feedback, which may be provided as uplink control information, e.g. Uplink Control Information.

This allows the network node to adapt the CSI report content to the actual or current need, while avoiding higher layer (e.g. RRC) reconfiguration of CSI report types when the UE increases the speed (e.g. to move from closed loop CSI report to open loop CSI report).

Another benefit is that high resolution CSI reports (which are costly in overhead) do not need to be feed back every time a CSI report is requested, but only when the network chooses or instructs to do so, e.g. when the incurred uplink overhead is judged to be affordable for a system perspective. After a high resolution feedback, the reports can be dynamically switched back to a lower resolution/lower payload report type.

It may be considered that a network node, e.g. a serving node (e.g. eNB) in a wireless network (or Radio Access Network) transmits a CSI report request message to a terminal (e.g. UE) in a downlink control information message (DCI) (e.g. carried in PDCCH or any other downlink control channel).

The DCI contains an indicator to one of multiple different report types (e.g., CSI report types or more generally measurement report types), which may represent a set of possible report types. The terminal or UE computes CSI (representing a measurement report) according to the requested (CSI) report type and feeds back the CSI report to the network, by transmitting the measurement report.

Different report types or specifically CSI report types may be associated with different data transmission schemes. Alternatively or additionally, a report type or report like a CSI report may be associated with different explicit (CSI) reporting schemes.

Possible report types (in particular, CSI report types), which any one or any one combination of which may constitute the set of possible report types and/or be comprised therein, include:

Single port, in particular single CSI-RS port (CSI-Reference Signal port)

Transmit diversity across two or more ports, e.g. two or more CSI-RS ports

Open loop spatial multiplexing using two or more ports, e.g. two or more CSI-RS ports Semi-open loop multiplexing using two or more ports, e.g. two or more CSI-RS ports Closed loop spatial multiplexing using two or more ports, e.g. two or more CSI-RS ports High resolution measurement report, e.g. CSI feedback, using two or more ports, e.g. two or more CSI-RS ports Reciprocity based feedback, which mat pertain to a frequency range used for transmission by both the network node and the terminal Analog channel feedback Interference report The downlink control information message may also comprise, and/or the CSI report type (and/or the measurement report type indication) may be combined with, an indication of a frequency interval (set of subcarriers, set of resource elements, resource blocks, etc.) for which the terminal or UE shall assume that the precoder is held fixed at the transmitter (known as precoder resource group (PRG) in LTE specifications). For example, closed loop spatial multiplexing CSI report type could be requested with an indication of either of two such intervals.

The downlink control information message may also comprise, and/or the CSI report type (and/or the measurement report type indication) may also include an MR indication, indicating whether or not measurement restriction (MR) is ON/OFF, wherein MR can be interpreted generally to be either in frequency or time or both. When MR is off, the UE is free to interpolate across subframes in time and/or resource blocks in frequency when performing the estimate or determining or calculating the measurement report, while when MR is on, there is a restriction what the UE may do. An example of MR on is adopted in LTE Rel. 13, according to which MR ON means that the UE is only allow to use CSI measurements from a single subframe (no time interpolation).

The downlink control information message and/or the measurement report type indication, in particular a CSI report type indication, could also include an indication of a delay or offset, in particular a subframe offset, which may indicate a parameter k. Such an indication may indicate an offset or delay (e.g., in subframes) for transmitting the measurement report, e.g. that the measurement report or CSI report is to be transmitted k time units (e.g., subframes) later (delayed). K for example could be selected to be zero for fast feedback, e.g. fast CSI feedback. k>0 could apply for example to consider that the terminal or UE needs more time, e.g., to prepare a high resolution report. There may generally be considered that the value of k is based on, and/or related to, and/or limited by, the measurement report indication.

It may be considered that the downlink control information message, and/or measurement report type indication, or report type indicates a selection between a reference signal received power (RSRP) type of report or a full measurement/CSI report as in LTE (with rank, precoder matrix index and CQI and CRI or corresponding). To support beam management, RSRP type of reporting could be sufficient. In this case, the terminal may be configured to measure and report RSRP for a set number of configured CSI-RS resources. The set or set number could typically be large (for example 32 resources where each resource is a beam). For more detailed feedback, e.g. CSI feedback, a full measurement report may or CSI report may be needed, wherein the terminal or UE reports PMI, RI, CQI and possibly CRI (CSI resource index selection) and the number of resources is typically smaller, e.g. 4. It is beneficial to be able to dynamically switch between these two different report types to efficiently support beam management, with the need to change the reference signals or ports used (e.g. CSI-RS).

In a further embodiment, the set of CSI-RS ports to use for the actual CSI report is also included in the downlink control information message, which may be a triggering or instructing DCI message as described herein. For instance, a low spatial resolution CSI report can be triggered with only 2 ports, e.g. 2 CSI-RS ports a high spatial high resolution report can be indicated with e.g. 32 ports, e.g. CSI-RS ports Generally, the downlink control information message (and/or the measurement report type indication) may indicate a number of ports, which may be the number of ports to be used for measurements or on which the measurement report is based upon. Thus, the number of ports can also be a parameter that is dynamically indicated in the message.

In a further embodiment, it may be considered that the interpretation of the DCI message is semi-statically configured by higher layers. This may reduce signaling overhead. In particular it may be considered that the terminal is configured, e.g. by higher layer signaling like RRC signaling, on how to interpret information and/or a bit sequence (containing one or more bits) of and/or contained in and/or representing the downlink control information message. For example, the DCI message may contain one bit to indicate the requested CSI report type, and the terminal may select, and/or be configured to select, and/or comprise a selecting module for selecting, between two types that have been previously been configured by RRC signaling.

It may be considered that the downlink control information message (e.g., the DCI message that triggers the CSI report), which may include the measurement type report type indication or the CSI report type, also contains an indication and/or information indicating the scheduling or allocation of resource/s (in particular, time-frequency resource/s for transmitting the measurement report), and/or pertaining to the configuration of the transmission of the measurement report (in particular, a corresponding uplink message like a UCI message).

Generally, it may be considered that the terminal is configured with, and/or has stored in a memory, one or more tables of measurement report types like CSI report types, which may also comprise associated parameters. Such table/s could be defined and/or configured by the network or network node, e.g. via by higher layer signaling like RRC signaling. A measurement report type indication (and/or related indications) may indicate and/or index the table to access and/or one or more table entries to access to determine which report type and/or associated parameters the measurement report is to be based on. The terminal or UE could be higher layer (e.g. RRC) configured with a particular table, and the downlink control information message (e.g., DCI message) could contain an index into that table to indicate what report type or CSI report type to prepare.

In some embodiments, the downlink control information message and/or measurement report type indication or type (and/or CSI feedback report type) may be associated with one or more other parameters pertaining to construction of the report or the CSI report. The parameter/s may represent and/or indicate a measurement hypothesis or CSI hypothesis. The hypothesis could reflect a certain transmission scheme, a receiver type, or both. For instance, the measurement report type (and/or the downlink control information message) could indicate whether the terminal or UE shall base the measurement report on different receiver types or setups, in particular the CSI report, e.g. on receiver type 1 or 2, wherein those types may be defined by specification/s. As an example, receiver type 1 could be a IRC receiver while type 2 could be a more advanced receiver with capability to suppress interference from simultaneously transmitted code words (sometimes known as CWIC receiver).

The indication or parameters may identify at least the measurement report type and/or CSI feedback report type (such as those listed above), and/or for example the CSI-RS ports to measure, including a number of CSI-RS ports to be measured. Further parameters identified within a (measurement/CSI) hypothesis that the terminal or UE may use in determining feedback, in particular calculating CSI feedback, may include one or more of:

A codebook and/or parameters used to configure the codebook, possibly including the number of ports in one or more codebook dimensions, a codebook configuration, an oversampling ratio for one or more codebook dimensions, a codebook subsampling submode, If the terminal or UE can only use measurements from a restricted time period to determine or compute the feedback CSI (also called "measurement restriction") as discussed above Whether the terminal or UE can assume a reference signal is present Whether the terminal or UE can assume a control channel is present In some embodiments, a terminal or UE may switch its feedback reporting and/or CSI feedback reporting among different (measurement or CSI) hypotheses, such that it may be required to determine feedback, in particular calculate CSI, according to one of a set of hypotheses at a time. The terminal or UE may be configured with this set of (measurement/CSI) hypotheses using higher layer signaling, e.g. RRC signaling. It may be considered that the downlink control information message, or a separate downlink control information message, like a DCI message comprises and indication or indicates which hypothesis a terminal or UE should use to generate a given feedback or CSI report. The time at which a terminal or UE decodes a downlink control information message or DCI transmission indicating or identifying a hypothesis can be designed as a time '$t_1$'. The terminal or UE may be required to be able to report within some minimum time from time $t_1$, assuming the needed reference signaling, like CSI-RS, and/or interference measurement resources are available at or prior to time $t_1$ (that is, when the reference resources required for the report are "valid"). In some embodiments, if no valid reference resource is available at time $t_1$, the terminal or UE may provide a report CSI report indicating that the report, in particular the CSI report, is not valid (for example "out of range"), or alternatively provides a report like a CSI report that is unchanged from a prior report. Furthermore, it may be considered that when the time between time $t_1$ and the time $t_2$ at which the terminal or UE must provide a report is less than some minimal time difference $\Delta_\alpha = t_2 - t_1$, then the terminal or UE may provide a report or CSI report indicating that the report is not valid (for example "out of range"), or alternatively provides a CSI report that is unchanged from a prior CSI report.

In some cases, in which a terminal or UE may switch among different (measurement or CSI) hypotheses, a terminal or UE may calculate a report using multiple measurements of ports and/or interference, in particular CSI-RS ports and/or interference. The terminal or UE may, for example, average channel estimates derived from the ports and/or average measurements of interference. When it receives a downlink control information message, in particular DCI, indicating a different hypothesis than was indicated by a prior message, the terminal or UE may provide a report indicating that the report is not valid, or alternatively may provide a report that is unchanged from a prior report.

A downlink control information message like DCI that triggers (and/or indicates and/or configures) aperiodic report may contain or comprise an indication of which type of measurement report or CSI report is requested.

It may be considered that a terminal is adapted to provide a measurement report indicating that the report is not valid is it receives contradictory or incompatible downlink control information messages and/or triggers, e.g. in a prescribed time interval, which may shorter than a typical indicate measurement period for measuring reference signaling and/or determining and/or transmitting a measurement report. For example, if a terminal or E receives a first DCI trigger and a second, later, DCI trigger identifying different CSI reporting types or CSI hypotheses, the terminal or UE may provide a report indicating that the report is not valid or transmit a report that is the same as a prior report.

Alternatively or additionally to the foregoing, approaches on a reference signaling scheme, respectively a CSI acquisition framework for NR are given.

Some issues discussed include:
RS transmission for CSI acquisitions
For example, one or more CSI-RS resources with 1, 2, 4, 8,12, and more ports each
CSI measurement/reporting
For example
Transmission method/scheme
Downlink control signaling
Decoupling of these allows for a very flexible framework for multi antenna transmissions in N. Regarding transmission method and schemes, a related question is whether there is a need at all to introduce multiple transmission modes in NR, at least for covering the eMBB use cases. In LTE, the transmission mode is tied to a certain DCI formats, transmission schemes and CSI reporting types. With decoupling of these, the introduction of transmission modes in NR makes less sense.

Regarding RS transmission and CSI measurement/reporting, the RS (Reference Signaling) could be configured either semi-persistently, and/or could be triggered individually, e.g. as a single shot RS (aperiodic). The periodic RS transmission, which may be considered always on (mandatory, such as CRS in LTE), or configured by RRC, could be omitted or not implemented in NR. To facilitate forward compatibly (empty subframes), to reduce interference, to meet energy efficiency (EE) requirement target (1000 times more efficient than LTE) without overloading the RRC protocol with unnecessary RRC reconfigurations.

Proposal: Periodic RS (always on as CRS in LTE or RRC configured RS) is not supported in NR.

Note that semi-persistent RS is also periodic, but with the possibility for fast activation and deactivation by MAC CE (Medium Access Control Control Element) or downlink control information like DCI, thus avoiding the drawbacks mentioned above. Likewise, the CSI measurement and report could be semi-persistent or aperiodic.

Proposal: Periodic CSI measurements/reporting (as RRC configured PUCCH in LTE) is not supported in NR.

The three following possible and flexible combinations of CSI-RS and CSI reporting are discussed:
Case 1: Semi-persistent RS and semi-persistent CSI measurements/reporting
Case 2: Semi-persistent RS and aperiodic CSI measurements/reporting
Case 3: Aperiodic RS and aperiodic CSI measurements/reporting
Case 1 is similar to periodic reporting in LTE and the CSI usually carries a low granular, low payload report. The purpose is not primarily for detailed link adaptation for transmitting data but more to keep a rough estimate of the link quality for the UE. Hence, the number of antenna ports is typically small and/or the used PMI codebook has low oversampling factor/low spatial resolution.
Case 2 is similar to aperiodic reporting in LTE. The CSI report can be larger and more detailed, with the aim to provide input for link adaptation of data transmission. Hence, the report is triggered whenever there is data in the buffer. Since RS is semi-periodically configured, there is a delay and overhead in enabling and disabling this RS. Hence, it is not expected that the periodicity of this is short as this would incur too much RS overhead.
Case 3 is used for very fast CSI feedback (in the same subframe) or to trigger a high resolution CSI report. It can also be used to trigger a CSI-RS beam sweep (CSI-RS is repeated in every OFDM symbol) in the beam management procedures. It is probably most efficient if the same DCI message is used to trigger both the CSI-RS and the associate CSI report.

The combination of aperiodic RS and semi-persistent CSI measurement and reporting has been left out as it does not make sense to measure without a RS present. Moreover, case 2 seem to make most sense is measurement restriction (MR) is configured to be OFF but there may be timing issues to consider that distinguish Case 2 and 3 when MR is OFF and this needs to be further studied.

There may be considered to:
Support dynamic switching between transmission methods/schemes, e.g. between
Transmit diversity
Spatial multiplexing
When the terminal or UE computes CSI, it under a certain hypothesis of how the BS is transmitting and the UE is receiving. Regarding CSI measurement and reporting trigger in the aperiodic report (Case 2 and 3), there are some benefits of allowing for dynamic switch between the transmission scheme/method the terminal or UE shall assume as the transmission hypothesis when creating the CSI report.

Different transmission schemes include for instance:
Transmit diversity (e.g. one layer using two DMRS (De-Modulation Reference Signaling) ports)
Terminal or UE specific precoded spatial multiplexing (one DMRS port per layer) directive antenna gain
Randomized precoder spatial multiplexing (one DMRS port per layer) for robustness
But also different QCL assumptions, CSI-IM (CSI Interference Measurement) assumptions, MU/SU-MIMO (Multi-User/Single User Multiple Input-Multiple Output, multiple antenna usage schemes) hypothesis (e.g. dynamic rank restriction) and receiver type hypothesis as example for measurement hypotheses can be dynamically indicated when triggering the CSI measurement/report. This allows for very fast changing of the CSI acquisition (and/or reporting) to adapt to the changes in UE speed, network load, availability of MU-MIMO or D-MIMO scheduling etc. Thereby, RRC reconfigurations of parameters that depends on dynamically fluctuating external variables such as traffic load is avoided. Moreover, a UE may use different services simultaneously and with a dynamic CSI reporting types the BS can trigger CSI report that suits the intended transmission method.

Proposal: When triggering an aperiodic CSI report, the triggering DCI may contain information that support dynamic switching between transmission methods/schemes the UE shall assume when computing CSI, e.g. between
    Transmit diversity
    Spatial multiplexing These approaches support 1) a dynamic selection of CSI report information and 2) dynamic selection of transmission modes/schemes. Additionally, 3) the presence of CSI-RS can be controlled, either a single shot RS or enabling/disabling of a semi-persistent RS. This provides a good framework for a decoupled CSI framework where many different use cases can be supported without the need to introduce new transmission modes as was done in LTE.

Also, with this decoupling and modular approach, it is easy to introduce new CSI measurements or reporting types in later NR releases without changing the transmission scheme and vice versa. To fully accomplish this, it is likely also beneficial if the DCI format payload size is unchanged. Hence, it should be possible to configure using higher layers the interpretation of bits in the DCI format that triggers a CSI report or schedules a data transmission without changing the payload, i.e. the DCI format size.

Proposal: Minimize the number of different DCI formats in NR, instead rely on configuration of the interpretation of some of the bits in the DCI format, at least for those that are associated to the transmission method/scheme and CSI report type The CSI reporting mentioned herein may be considered examples of transmitting a measurement report as described herein.

FIG. 1 schematically show a network node or base station 100, which in particular may be an eNodeB. Network node 100 comprises control circuitry 120, which may comprise a controller connected to a memory. Any module, e.g. receiving module and/or transmitting module and/or configuring module of the network node may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. The antenna circuitry may be connected to and/or comprise an antenna array.

Figure 2:
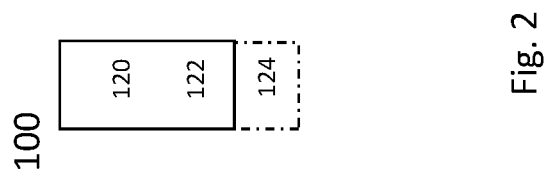
FIG. 2, showing an exemplary network node.

FIG. 2 schematically shows a terminal 10, which may be implemented in this example as a user equipment. Terminal 10 comprises control circuitry 20, which may comprise a controller connected to a memory. Any module of the terminal, e.g. receiving module and/or transmitting module and/or report type determining module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell /carrier and a second cell /carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry.

Figure 3:
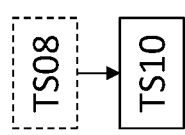
FIG. 3, showing a flow diagram of an exemplary algorithm or method.

FIG. 3 shows a flow diagram indicating an algorithm for a method for operating a terminal as described herein. The method may comprise an action TS10 of transmitting a measurement report on received reference signaling, wherein the measurement report is based on one report type out of a set of possible report types, the report type of the measurement report being determined based on a measurement report type indication in a downlink control information message received by the terminal. Action TS10 may be based on an optional action TS08 of performing measurements based on the downlink control information message.

Figure 4:
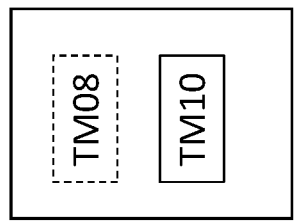
FIG. 4, showing another exemplary terminal.

FIG. 4 shows an exemplary terminal, e.g. a terminal as described herein. The terminal comprises a module TM10 for performing action TS10. Optionally, it may comprise a module TM08 for performing action TS08.

Figure 5:
FIG. 5, showing another flow diagram of an exemplary algorithm or method.

FIG. 5 shows a flow diagram indicating an algorithm for a method for operating a network node as described herein. The method may comprise an action NS10 of transmitting, e.g. to a terminal, a downlink control information message, the downlink control information message comprising a measurement report type indication indicating a report type of a measurement report, the report type being one report type out of a set of possible report types. The method may optionally comprise an action NS08 of setting the report type and/or setting the measurement report type indication in the message.

Figure 6:
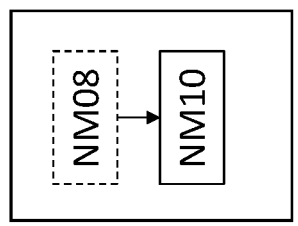
FIG. 6, showing another exemplary terminal.

FIG. 6 shows an exemplary network node for a RAN, e.g. a network node as described herein. The network node comprises a module NM10 for performing action NS10. Optionally, it may comprise a module NM08 for performing action NS08.

There is disclosed a carrier (or storage) medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Reference signaling in the uplink may be associated to a terminal, e.g. SRS.

A radio node or network node or base station may be any kind of radio node or base station of a wireless and/or cellular network adapted to serve one or more terminals or user equipments. It may be considered that a base station is a node or network node of a wireless communication network. A radio node or network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or radio node is adapted for one or more RATs, in particular LTE/E-UTRA. Radio circuitry may comprise for example a receiver device and/or transmitter device and/or transceiver device. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

An eNodeB (eNB) may be envisioned as an example of a network node or radio node or base station, e.g. according to an LTE standard. A radio node or base station may generally be proximity service enabled and/or to provide corresponding services. It may be considered that a radio node base station is configured as or connected or connectable to an Evolved Packet Core (EPC) and/or to provide and/or connect to corresponding functionality. The functionality and/or multiple different functions of a radio node or base station may be distributed over one or more different devices and/or physical locations and/or nodes. A radio node or base station may be considered to be a node of a wireless communication network. Generally, a radio node or base station may be considered to be configured to be a coordinating node and/or to allocate resources in particular for cellular communication between two nodes or terminals of a wireless communication network, in particular two user equipments.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

The invention claimed is:

1. A terminal for a Radio Access Network, comprising:
control circuitry and control radio circuitry collectively configured to:
receive radio resource control (RRC) signaling indicating a plurality of channel state information (CSI) report types;

receive downlink control information (DCI) comprising a CSI report type indication for an aperiodic CSI report and further comprising a scheduling indication separate from the CSI report type indication, the scheduling indication indicating time-frequency resources for transmitting the aperiodic CSI report and comprising a timing offset parameter K which is variable between 0 and a value larger than 0, wherein the timing offset parameter K indicates a number of subframes and is set to 0;

determine, based on the received CSI report type indication, a CSI report type among the plurality of CSI report types and, based on the received scheduling indication, the timing offset for transmitting the aperiodic CSI report in response to the DCI; and transmit the aperiodic CSI report according to the CSI report type and the timing offset.

2. The terminal of claim 1, wherein the CSI report type indicates a transmission setup for CSI reference signaling.

3. The terminal of claim 1, wherein the plurality of CSI report types includes as possible report types report types pertaining to:

Single port use; and/or
Transmit diversity across two or more ports; and/or
Open loop spatial multiplexing using two or more ports; and/or
Semi-open loop multiplexing using two or more ports; and/or
Closed loop spatial multiplexing using two or more ports; and/or
High resolution measurement reporting, e.g. using two or more ports; and/or
Reciprocity based feedback; and/or
Analog channel feedback; and/or
Interference reporting.

4. A method for operating a terminal in a Radio Access Network, comprising:

receiving radio resource control (RRC) signaling indicating a plurality of channel state information (CSI) report types;

receiving downlink control information (DCI) comprising a CSI report type indication for an aperiodic CSI report and further comprising a scheduling indication separate from the CSI report type indication, the scheduling indication indicating time-frequency resources for transmitting the aperiodic CSI report and comprising a timing offset parameter K which is variable between 0 and a value larger than 0, wherein the timing offset parameter K indicates a number of subframes and is set to 0;

determining, based on the received CSI report type indication, a CSI report type among the plurality of CSI report types and, based on the received scheduling indication, the timing offset for transmitting the aperiodic CSI report in response to the DCI; and transmitting the aperiodic CSI report according to the CSI report type and the timing offset.

5. The method of claim 4, wherein the CSI report type indicates a transmission setup for CSI reference signaling.

6. The method of claim 4, wherein the plurality of CSI report types includes as possible report types report types pertaining to:

Single port use; and/or
Transmit diversity across two or more ports; and/or
Open loop spatial multiplexing using two or more ports; and/or
Semi-open loop multiplexing using two or more ports; and/or
Closed loop spatial multiplexing using two or more ports; and/or
High resolution measurement reporting, e.g. using two or more ports; and/or
Reciprocity based feedback; and/or
Analog channel feedback; and/or
Interference reporting.

7. A network node for a Radio Access Network, comprising:

control circuitry and control radio circuitry collectively configured to:

transmit radio resource control (RRC) signaling indicating a plurality of channel state information (CSI) report types;

transmit downlink control information (DCI) comprising a CSI report type indication for an aperiodic CSI report and further comprising a scheduling indication separate from the CSI report type indication, the scheduling indication indicating time-frequency resources for transmitting the aperiodic CSI report and comprising a timing offset parameter K which is variable between 0 and a value larger than 0, wherein the timing offset parameter K indicates a number of subframes and is set to 0, wherein the CSI report type indication is associated with a CSI report type among the plurality of CSI report types and the timing offset parameter K for a user equipment (UE) to transmit the aperiodic CSI report in response to the DCI; and receive the aperiodic CSI report from the UE according to the CSI report type and the timing offset.

8. The network node of claim 7, wherein the CSI report type indicates a transmission setup for CSI reference signaling.

9. The network node of claim 7, wherein the plurality of CSI report types includes as possible report types report types pertaining to:

Single port use; and/or
Transmit diversity across two or more ports; and/or
Open loop spatial multiplexing using two or more ports; and/or
Semi-open loop multiplexing using two or more ports; and/or
Closed loop spatial multiplexing using two or more ports; and/or
High resolution measurement reporting, e.g. using two or more ports; and/or
Reciprocity based feedback; and/or
Analog channel feedback; and/or
Interference reporting.

10. A method for operating a network node in a Radio Access Network, comprising:

transmitting radio resource control (RRC) signaling indicating a plurality of channel state information (CSI) report types;

transmitting downlink control information (DCI) comprising a CSI report type indication for an aperiodic CSI report and further comprising a scheduling indication separate from the CSI report type indication, the scheduling indication indicating time-frequency resources for transmitting the aperiodic CSI report and comprising a timing offset parameter K which is variable between 0 and a value larger than 0, wherein the timing offset parameter K indicates a number of subframes and is set to 0, wherein the CSI report type indication is associated with a CSI report type among the plurality of CSI report types and the timing offset parameter K for a user equipment (UE) to transmit the aperiodic CSI report in response to the DCI; and receiving the aperiodic CSI report from the UE according to the CSI report type and the timing offset.

11. The method of claim 10, wherein the CSI report type indicates a transmission setup for CSI reference signaling.

12. The method of claim 10, wherein the plurality of CSI report types includes as possible report types report types pertaining to:

Single port use; and/or

Transmit diversity across two or more ports; and/or

Open loop spatial multiplexing using two or more ports; and/or

Semi-open loop multiplexing using two or more ports; and/or

Closed loop spatial multiplexing using two or more ports; and/or

High resolution measurement reporting, e.g. using two or more ports; and/or

Reciprocity based feedback; and/or

Analog channel feedback; and/or

Interference reporting.

13. A non-transitory computer-readable storage medium storing instructions adapted for causing control circuitry to carry out and/or control a method according to claim 4.

14. The terminal of claim 1, wherein the control circuitry and control radio circuitry are further collectively configured to determine, based on the CSI report type indication, whether the CSI report type is a reference signal received power (RSRP) type of report or a report type comprising a rank indication (RI), precoder matrix indicator (PMI) and channel quality information (CQI), and CSI-RS resource indicator (CRI).

15. The terminal of claim 1, wherein the control circuitry and control radio circuitry are further collectively configured to:

determine whether CSI resources required for one or more additional CSI reports are valid; and upon determining that the additional CSI resources required for the one or more additional CSI reports are not valid, transmit the one or more additional CSI reports unchanged from prior CSI reports.

16. The terminal of claim 1, wherein the control circuitry and control radio circuitry are further collectively configured to determine a time restriction for one or more additional CSI reports, and transmit the one or more additional CSI reports according to the time restriction.

17. The method of claim 4, further comprising determining, based on the CSI report type indication, whether the CSI report type is a reference signal received power (RSRP) type of report or a report type comprising a rank indication (RI), precoder matrix indicator (PMI) and channel quality information (CQI), and CSI-RS resource indicator (CRI).

18. The method of claim 4, further comprising:

determining whether CSI resources required for one or more additional CSI reports are valid; and upon determining that the additional CSI resources required for the one or more additional CSI reports are not valid, transmitting the one or more additional CSI reports unchanged from prior CSI reports.

19. The method of claim 4, further comprising determining a time restriction for one or more additional CSI reports, and transmitting the one or more additional CSI reports according to the time restriction.

20. The method of claim 4, wherein each of the CSI feedback report types is associated with hypothesis parameters to form a plurality of CSI hypotheses, and wherein the hypothesis parameters comprise at least one of a set of CSI-RS ports to measure, a codebook configuration, whether CSI measurements are restricted in time, whether the UE can assume a reference signal is present, and whether the UE can assume a control channel is present.

21. The method of claim 20, wherein when the UE is triggered to calculate CSI for more than one of the CSI hypotheses at a time, the UE reports updated CSI for only one of the hypotheses at a time.

* * * * *